United States Patent [19]
Loomba

[11] 3,937,258
[45] Feb. 10, 1976

[54] FLEXIBLE FLAPPER

[75] Inventor: Yogendra S. Loomba, Roseville, Mich.

[73] Assignee: Allied Chemical Corporation, New York, N.Y.

[22] Filed: Dec. 1, 1972

[21] Appl. No.: 311,061

Related U.S. Application Data

[63] Continuation of Ser. No. 132,861, April 9, 1971, abandoned.

[52] U.S. Cl. .............. 141/67; 141/326; 137/525.3; 280/150 AB
[51] Int. Cl.² ......................................... B65B 3/04
[58] Field of Search ...... 23/281; 141/123, 313, 114, 141/325, 326, 327, 98, 67; 137/525, 525.1, 525.3

[56] References Cited
UNITED STATES PATENTS

| | | | |
|---|---|---|---|
| 2,553,319 | 5/1951 | Hruska | 137/525.3 |
| 3,610,657 | 10/1971 | Cole | 280/150 AB |
| 3,767,225 | 10/1973 | Mazelsky | 137/525.1 |

Primary Examiner—Houston S. Bell, Jr.
Attorney, Agent, or Firm—John P. Kirby, Jr.; Jonathan Plaut

[57] ABSTRACT

A flexible flapper valve covering the opening between manifold and bag assembly in a safety restraint inflatable bag system.

5 Claims, 2 Drawing Figures

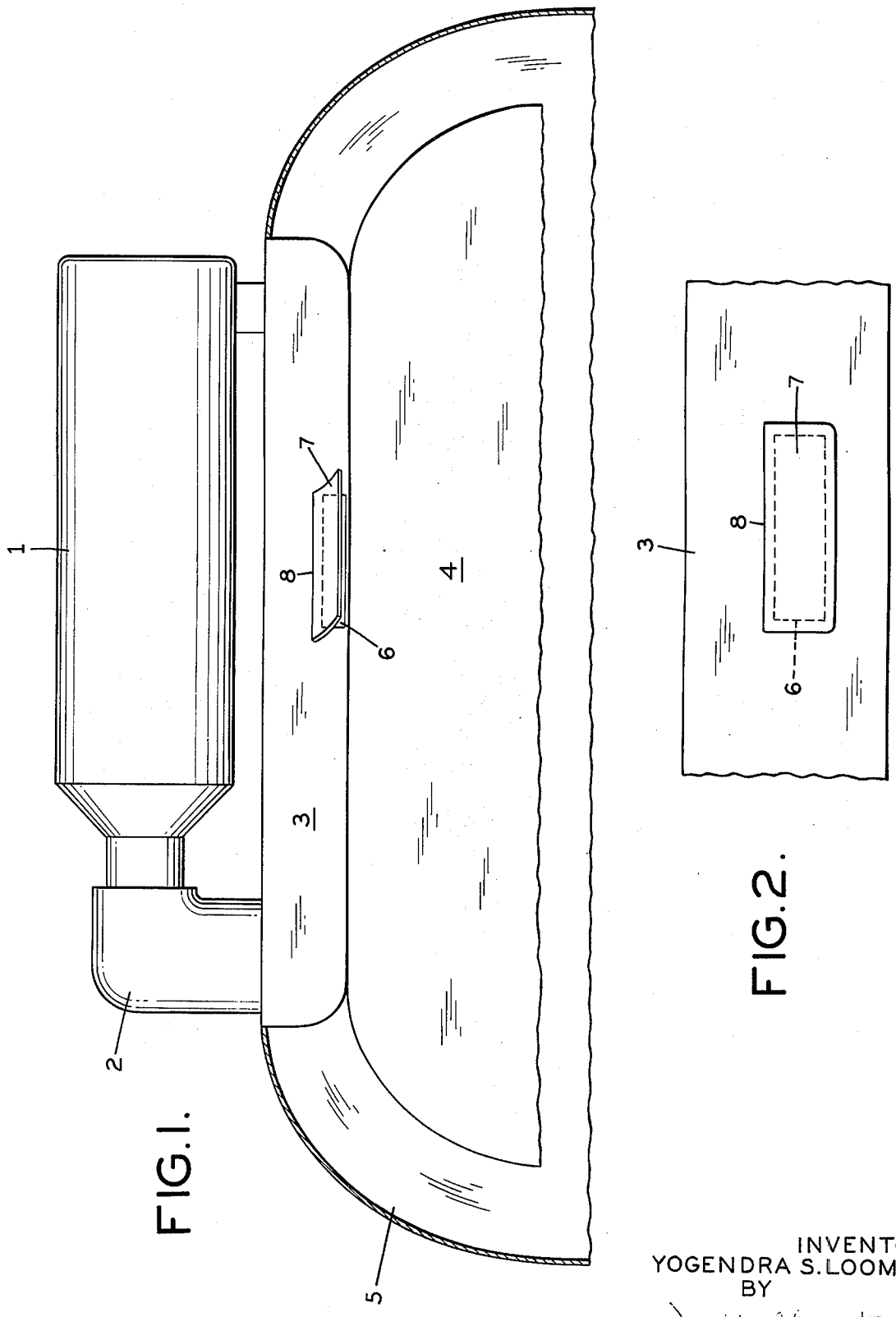

FLEXIBLE FLAPPER

This is a continuation, of application Ser. No. 132,861, filed Apr. 9, 1971.

This invention relates to flexible flapper valve in a safety restraint system for protection of an occupant in a vehicle in which the system is mounted. More particularly, this invention relates to a flexible flapper valve cover at the point at which gas leaves the manifold and enters the inflatable bag system.

BRIEF SUMMARY OF THE INVENTION

A flexible flapper valve mounted over the exit opening of the manifold, in one embodiment employed for the filling of a smaller or knee bag mounted within a larger protective bag. The flapper valve cover is preferably mounted on one side thereof, preferably along the top of the valve, to the outside of the manifold cover over an opening through which inflating gasses leave the manifold and enter the bag system. Due to the flexible nature of the flapper it allows for flow of the inflating gas into the knee bag, for example, from the manifold, but seals (1) against the manifold to prevent back flow of the gas into the manifold when the knee bag is filled and pressure equalized or of other communication between the knee bag and manifold under other than inflating conditions.

Other objects and advantages of the invention will become apparent upon examination of the following drawings and more detailed disclosure.

BRIEF DESCRIPTION OF THE DRAWINGS

FIG. 1 shows a bag inflating system; and
FIG. 2 shows the flapper valve detail.

DETAILED DESCRIPTION OF INVENTION

According to the system of FIG. 1, gas from a source 1 (either (a) stored in a cylinder, (b) a hybrid system of stored gas and gas produced from a pyrotechnic powder or (3) gas produced only from a burning powder) is directed into a manifold 3 through a passageway 2. In many applications, a smaller bag 4 referred to hereafter in the specific embodiment illustrated as a knee bag, but not limited thereto, located within the primary inflatible gab 5 is inflated first, in order to (a) position the occupant, (b) provide restraint to said occupant and especially to his lower torso and legs, (c) capture the first hot gasses in an interior bag, and/or (d) provide for energy absorption.

Inflating gas enters the smaller bag 4 from the manifold through opening 6 which is covered by flexible flapper valve cover 7 connected to the outside surface of the manifold 3 by suitable means such as use of adhesive at the top 8 thereof, as in the embodiment shown. The flapper valve cover may be made of rubber, flexible nylon, other flexible plastic material, or of other suitable flexible material as desired.

In operation, on the first flow of gas from the gas source through the manifold, flexible flapper valve 7 opens under the pressure differential to allow the gas to fill the unexpanded smaller bag 4. When said bag is filled, however, and a pressure balance is thus substantially achieved, the flapper valve 7 returns to its normal position against the outside surface of the manifold and (2) further flow into the smaller bag estimated, forcing flow into the primary bag 5 through other entry ports.

In FIG. 2, the flexible flapper valve 7 is shown in its normal position against the outer surface of the manifold 3. The provision of flexibility for the flapper valve allows for relatively inexpensive construction and ease of attachment, as compared to a rigid metal flap, for example, and, most important, allows for effective seal of the cover against the outer surface of the manifold 3, without, for example, machined indenture provisions on said surface of the manifold to receive said flap and allow for a seal.

Having described the invention with relation to the embodiment shown in the drawings, I claim:

1. A safety restraint system for protection of an occupant in a vehicle in which the system is mounted, said system comprising: a gas source, a manifold, an inflatable bag assembly surrounding an outer surface of said manifold, an opening in said manifold communicating with at least a portion of said bag assembly for passing gas from the gas source into the bag assembly, said bag assembly including a smaller inflatable restraint within a larger inflatable primary restraint, said first-mentioned restraint only in receipt of gas passed through said opening, said manifold being apertured in locations in addition to said opening in order to feed gas therethrough to the primary restraint, and an unapertured, substantially flat, unitary, flexible flapper valve cover attached to said outer surface of said manifold so as to alternately be in a position to completely cover said opening and block passage of gas without protruding thereinto and to uncover said opening to allow passage of gas into said smaller restraint dependent on gas pressure therein, said valve cover opening under pressure differential and closing when pressure balance is substantially achieved, and said valve cover having movement, to open or close, in a direction approximately perpendicular to the outer surface of said manifold.

2. A safety restraint system as claimed in claim 1, said flapper valve cover made of rubber.

3. A safety restraint system as claimed in claim 1, said flapper valve cover made of flexible plastic.

4. A safety restraint system as claimed in claim 1, said valve cover biased in its position mounted on the manifold so as to normally cover said opening unless moved by pressure differential away therefrom.

5. A safety restraint system as claimed in claim 4, said flapper valve cover mounted at the top thereof to the manifold.

* * * * *